United States Patent
Uehara

(10) Patent No.: US 10,664,944 B2
(45) Date of Patent: May 26, 2020

(54) DATA TRANSFER APPARATUS AND DATA TRANSFER METHOD FOR TRANSFERRING DATA PACKETS HAVING VARYING RATIO OF VALID DATA TO DUMMY DATA

(71) Applicant: Renesas Electronics Corporation, Tokyo (JP)

(72) Inventor: Yayumi Uehara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 231 days.

(21) Appl. No.: 15/802,287

(22) Filed: Nov. 2, 2017

(65) Prior Publication Data

US 2018/0182064 A1  Jun. 28, 2018

(30) Foreign Application Priority Data

Dec. 26, 2016 (JP) ................................. 2016-250776

(51) Int. Cl.
- *G06T 1/60* (2006.01)
- *G06F 3/06* (2006.01)
- *H04N 21/236* (2011.01)

(52) U.S. Cl.
CPC .............. *G06T 1/60* (2013.01); *G06F 3/0656* (2013.01); *H04N 21/23611* (2013.01); *G06T 2200/28* (2013.01); *H04N 2201/0089* (2013.01)

(58) Field of Classification Search
CPC ........................ G06T 1/60; G06T 2207/30121
See application file for complete search history.

(56) References Cited

U.S. PATENT DOCUMENTS

| 4,692,894 A | * | 9/1987 | Bemis | ..................... H04L 25/05 710/57 |
| 5,107,457 A | * | 4/1992 | Hayes | ..................... G06F 7/785 711/132 |
| 5,122,874 A | * | 6/1992 | Lhuillier | ................ H04N 19/10 375/240.05 |
| 5,321,809 A | | 6/1994 | Aranda | |

(Continued)

FOREIGN PATENT DOCUMENTS

| JP | 06-175646 A | 6/1994 |
| JP | 2006-276221 A | 10/2006 |
| WO | 2007/116539 A1 | 10/2007 |

OTHER PUBLICATIONS

Extended European Search Report dated Apr. 26, 2018 in European Patent Application No. 17207382.7.

(Continued)

*Primary Examiner* — Phong X Nguyen

(74) *Attorney, Agent, or Firm* — McDermott Will & Emery LLP

(57) ABSTRACT

A data transfer apparatus capable of effectively performing image transfer in a simple manner is provided.

The data transfer apparatus that transfers image data in an image buffer memory to a display includes: a packet generation section that generates a transfer packet included of valid data and dummy data, the valid data being the image data, and transfers the transfer packet to the display; and a packet generation section that adjusts a ratio between the valid data and the dummy data in the transfer packet based on a data storage amount in the image buffer memory.

7 Claims, 13 Drawing Sheets

(56) References Cited

U.S. PATENT DOCUMENTS

| | | | | | |
|---|---|---|---|---|---|
| 5,534,937 | A | * | 7/1996 | Zhu | H04N 21/23406 348/467 |
| 5,717,641 | A | * | 2/1998 | Ando | H04N 7/17336 348/E7.073 |
| 5,802,068 | A | * | 9/1998 | Kudo | H04J 3/247 370/528 |
| 6,141,055 | A | * | 10/2000 | Li | H04N 7/0105 348/446 |
| 6,219,381 | B1 | * | 4/2001 | Sawada | H04N 5/783 348/E7.073 |
| 6,347,098 | B1 | * | 2/2002 | Ejiri | H04J 3/047 370/532 |
| 6,557,109 | B1 | * | 4/2003 | Sato | G06F 5/12 710/57 |
| 6,778,221 | B1 | * | 8/2004 | Nishioka | H04N 7/014 348/441 |
| 2003/0080971 | A1 | * | 5/2003 | Hochmuth | G06F 3/14 345/619 |
| 2005/0147033 | A1 | * | 7/2005 | Chin | H04N 21/2343 370/229 |
| 2006/0029271 | A1 | * | 2/2006 | Miyoshi | G06T 3/00 382/154 |
| 2006/0056242 | A1 | * | 3/2006 | Takeshita | H04L 12/56 365/189.05 |
| 2006/0209335 | A1 | * | 9/2006 | Sasaki | H04N 21/23611 358/1.15 |
| 2006/0214902 | A1 | * | 9/2006 | Tamura | G06F 3/1431 345/100 |
| 2007/0253509 | A1 | | 11/2007 | Tanaka et al. | |
| 2009/0010342 | A1 | | 1/2009 | Nakano | |
| 2011/0069342 | A1 | | 3/2011 | Saisho | |
| 2013/0191861 | A1 | | 7/2013 | Sasaki et al. | |
| 2014/0321527 | A1 | * | 10/2014 | Inata | H04N 21/44209 375/240.01 |
| 2016/0121816 | A1 | * | 5/2016 | Koo | H04L 12/4013 370/476 |

OTHER PUBLICATIONS

Japanese Notice of Reasons for Refusal issued in corresponding Japanese Patent Application No. 2016-250776, dated Mar. 18, 2020, with English translation.

\* cited by examiner

DATA TRANSFER APPARATUS AND DATA TRANSFER METHOD FOR TRANSFERRING DATA PACKETS HAVING VARYING RATIO OF VALID DATA TO DUMMY DATA

CROSS-REFERENCE TO RELATED APPLICATIONS

The disclosure of Japanese Patent Application No. 2016-250776 filed on Dec. 26, 2016 including the specification, drawings and abstract is incorporated herein by reference in its entirety.

BACKGROUND

The present invention relates to a data transfer apparatus and a data transfer method, and specifically to a way of transferring image data.

Generally, an amount of image data is so large that the capacity of an internal memory built in a system is not enough. Thus, a high-capacity external memory is often used as a shared memory to store such data.

An update of the image data and other application processes are then performed on the shared memory. The shared memory is also accessed by other peripheral modules such as a processor, a camera, and the like.

When transferring the image data to a display or the like, generally a part of the image data is buffered in an image buffer memory because a response time from a read request to a read data output is long in the external memory.

A display transmitter then reads the image data buffered in the image buffer memory and outputs the image data to the display.

On the other hand, when the image buffer memory accesses the shared memory and competes with another module for the access, the data access by the image buffer memory may delay, buffering of the image buffer memory may not be done in time, and an underflow may occur to the image buffer memory. This delay of the buffering in the image buffer memory may disturb an image on the display.

Japanese Unexamined Patent Application Publication No. HEI6(1994)-175646 proposes a method of devising a buffering technique.

SUMMARY OF THE INVENTION

In the method according to Japanese Unexamined Patent Application Publication No. HEI6(1994)-175646, however, the image data transfer rate to the display is fixed, and thus it is required to construct a system to be in time for the image transfer to the display in order to retain the frame rate so that the image on the display may not be disturbed.

The present disclosure is made to address the above-mentioned problem, and aims to achieve a data transfer apparatus and a data transfer method capable of effectively performing image transfer in a simple manner.

Other problems and novel features will be apparent from the description of this application and accompanying drawings.

According to one embodiment, a data transfer apparatus that transfers image data in an image buffer memory to a display includes: a packet generation section that generates a transfer packet included of valid data and dummy data, the valid data being the image data, and transfers the transfer packet to the display; and a packet generation section that adjusts a ratio between the valid data and the dummy data in the transfer packet based on a data storage amount in the image buffer memory.

According to one embodiment, it is possible to effectively perform image transfer in a simple manner.

DETAILED DESCRIPTION

Embodiments will be described in detail with reference to drawings. It should be noted that same or equivalent components are denoted by same numerals and the explanation thereof may not be repeated.

<First Embodiment>

Figure 1:
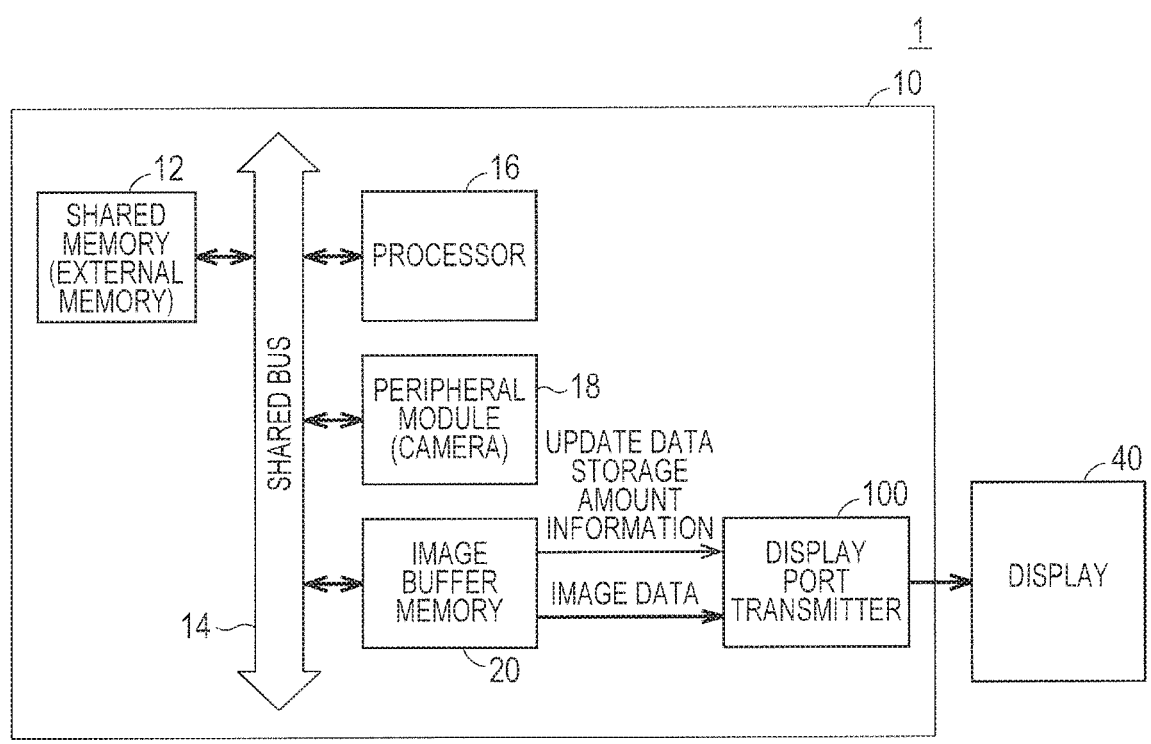
FIG. 1 illustrates an image system 1 according to a first embodiment.

FIG. 1 illustrates an image system 1 according to a first embodiment.

As shown in FIG. 1, the image system 1 includes an image data unit 10 and a display 40.

The image data unit 10 is a unit that processes image data, which is a kind of information processing unit.

The image data unit 10 includes a shared memory (external memory) 12, a shared bus 14, a processor 16, a peripheral module 18, an image buffer memory 20, and a display port transmitter 100.

The shared memory (external memory) 12 is a high-capacity memory, which may be, for example, a RAM (Random Access Memory).

The shared bus 14 is coupled to each component and provided to enable data communication among them.

The processor 16 controls the whole image data unit 10.

The peripheral module 18 is described taking an example of a camera module. Image data taken by the camera module is stored in the shared memory 12.

The image buffer memory 20 stores therein image data stored in the shared memory 12 after buffering.

The display port transmitter 100 transfers the image data stored in the image buffer memory 20 to the display 40. As an example, the display port transmitter 100 transfers the image data to the display 40 via a display port interface. More specifically, the display port transmitter 100 generates a transfer packet including the image data stored in the image buffer memory 20 and transfers the packet to the display 40 via the display port interface.

Moreover, the display port transmitter 100 according to the first embodiment adjusts the transfer packet (hereinbelow, also referred to simply as "packet") based on data storage amount information of the image buffer memory 20.

The transfer packet herein includes valid data and dummy data. The display port transmitter 100 adjusts a ratio between the valid data and dummy data based on the data storage amount information of the image buffer memory 20.

In this embodiment, the data storage amount information relates to a data storage amount and relates to whether the data storage amount is large or small. It should be noted that the data storage amount information is not limited to the aforementioned information but may be other information that provides the data storage amount by calculation.

Figure 2:
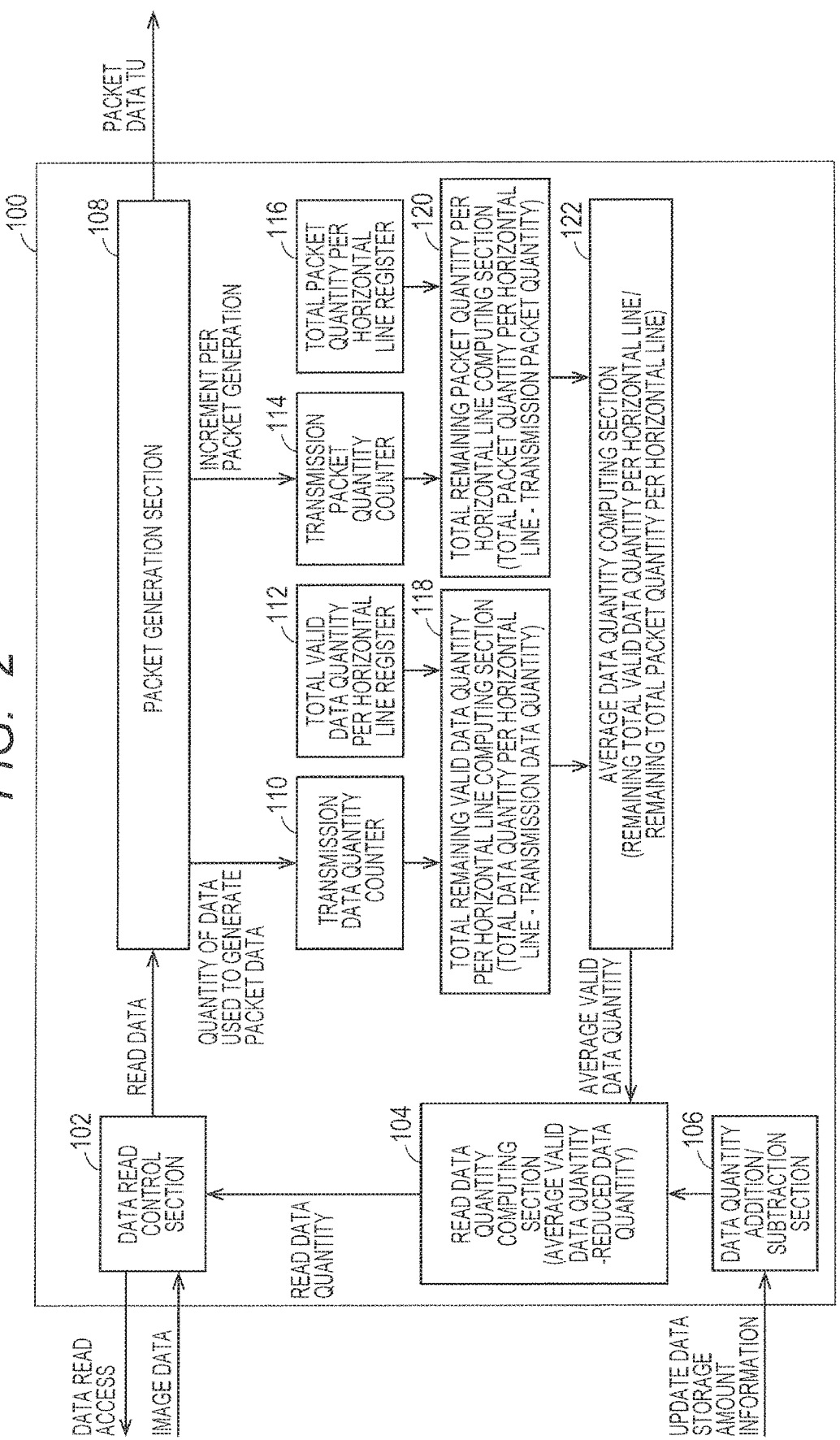
FIG. 2 is a functional block diagram of a display port transmitter 100 according to the first embodiment.

FIG. 2 is a functional block diagram of the display port transmitter 100 according to the first embodiment.

With reference to FIG. 2, the display port transmitter 100 includes a data read control section 102, a read data quantity computing section 104, a data quantity addition/subtraction section 106, and a packet generation section 108. The display port transmitter 100 further includes a transmission data quantity counter 110, a total valid data quantity per horizontal line register 112, a transmission packet quantity counter 114, a total packet quantity per horizontal line register 116, a total remaining valid data quantity per horizontal line computing section 118, a total remaining packet quantity per horizontal line computing section 120, and an average data quantity computing section 122.

The data read control section 102 instructs the image buffer memory 20 to read out data (data read) (data read access) and obtains image data from the image buffer memory 20.

The read data quantity computing section 104 outputs a value increased or decreased from an average valid data quantity according to an instruction from the data quantity addition/subtraction section 106 as a read data quantity.

The data quantity addition/subtraction section 106 instructs the read data quantity computing section 104 to add/subtract the amount of the valid data to be included in the transfer packet according to the update data storage amount. For example, it instructs the read data quantity computing section 104 to increase the amount of the valid data to be included in the transfer packet when the update data storage amount in the image buffer memory 20 is large, and to decrease the amount of the valid data when the update data storage amount is small.

The packet generation section 108 generates and outputs the packet data TU including the read data output from the data read control section 102.

Although a configuration of the packet data TU will be described later, the packet generation section 108 configures the read data as the valid data and the remaining data as dummy data in the packet data TU.

The transmission data quantity counter 110 counts the valid data quantity transmitted as the packet data TU.

A total valid data quantity in a single horizontal line specified in advance is set in the total valid data quantity per horizontal line register 112.

The total remaining valid data quantity per horizontal line computing section 118 subtracts the transmitted valid data quantity from the total valid data quantity in the single horizontal line to obtain the remaining valid data quantity.

The transmission packet quantity counter 114 counts the packet quantity transmitted as the packet data TU.

The total packet quantity for transmitting the valid data in the single horizontal line specified in advance is set in the total packet quantity per horizontal line register 116.

The total remaining packet quantity per horizontal line computing section 120 subtracts the transmitted packet quantity from the total packet quantity in the single horizontal line to obtain the remaining packet quantity.

The average data quantity computing section 122 divides the remaining valid data quantity by the remaining packet quantity. In this manner, the average valid data quantity per packet data TU to be transferred is calculated. That is, the average valid data quantity is updated every time the packet data is generated.

The average data quantity computing section 122 outputs the calculated average valid data quantity to the read data quantity computing section 104. It should be noted that an initial value can be set in advance and the read data quantity computing section 104 outputs the read data quantity to the data read control section 102 according to the initial value.

In this example, the data quantity addition/subtraction section 106 instructs the read data quantity computing section 104 to increase or decrease the read data quantity according to the update data storage amount information. The read data quantity computing section 104 outputs the value increased or decreased from the average valid data quantity output from the average data quantity computing section 122 according to the instruction from the data quantity addition/subtraction section 106 as the read data quantity. Thus, the read data quantity output from the read data quantity computing section 104 can be adjusted. The data read control section 102 thus obtains the image data from the image buffer memory 20 according to the read data quantity computed by the read data quantity computing section 104.

The data read control section 102 outputs the obtained image data to the packet generation section 108 as the read data. The packet generation section 108 generates and outputs the packet data TU using the obtained read data as the valid data.

Accordingly, when the update data storage amount in the image buffer memory 20 decreases, the read data quantity to be obtained is adjusted and the amount of the valid data per packet data TU is decreased.

On the other hand, when the update data storage amount in the image buffer memory 20 increases, the read data quantity to be obtained is adjusted and the amount of the valid data per packet data TU is increased.

With this method, the ratio between the valid data and the dummy data in a single packet data TU is adjusted based on the update data amount information of the image buffer memory 20.

Accordingly, when buffering of the image buffer memory 20 delays, ratio of the valid data in the packet data TU is adjusted to decrease the ratio of the valid data.

On the other hand, when the delay in buffering of the image buffer memory 20 is addressed, the ratio of the valid data in the packet data TU is adjusted to increase the ratio of the valid data.

This can prohibit occurrence of the underflow of the image buffer memory 20 and control disturbance of the image on the display 40.

Figure 3:
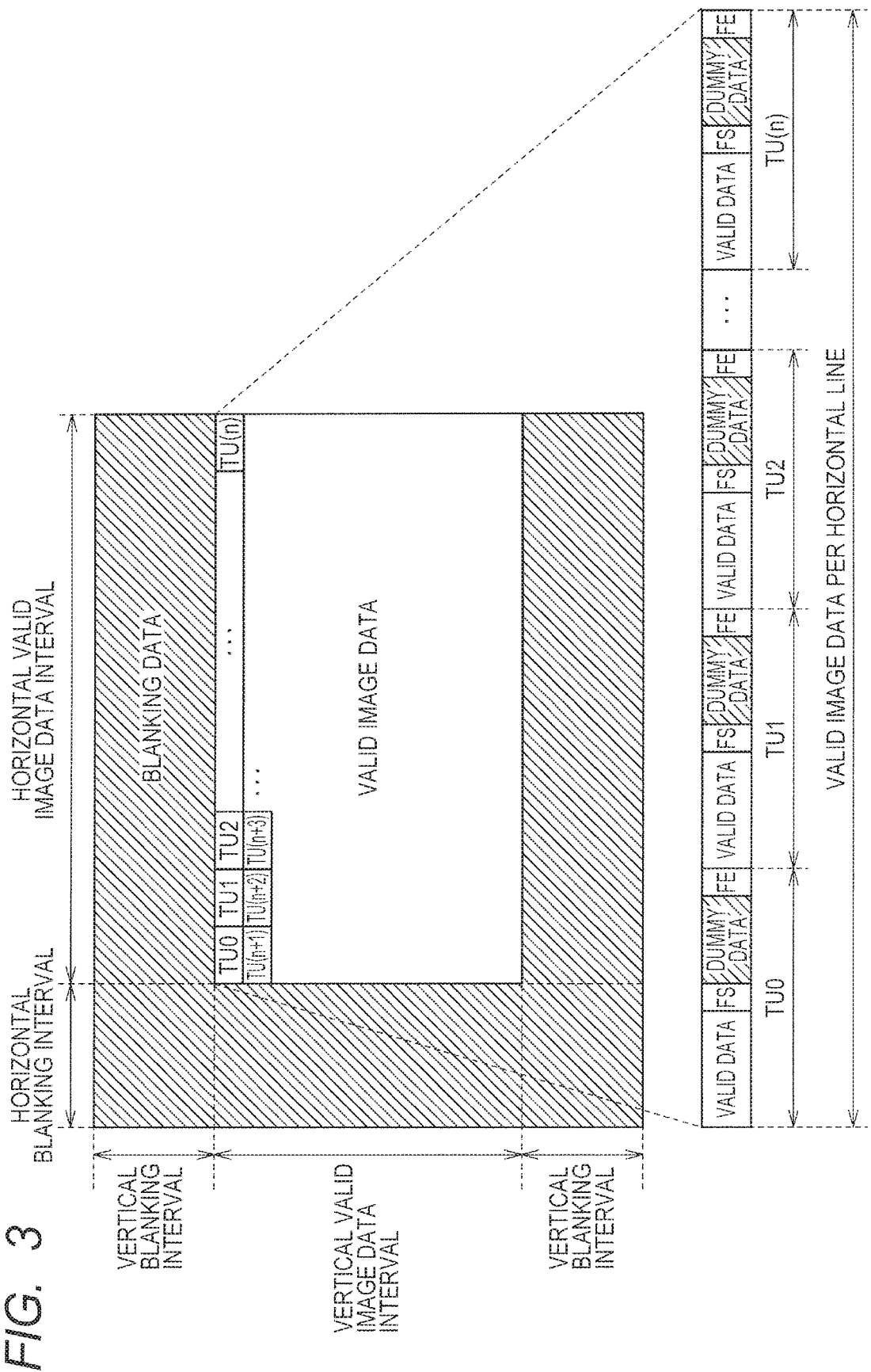
FIG. 3 illustrates a configuration of image data according to the first embodiment.

FIG. 3 illustrates a configuration of image data according to the first embodiment.

FIG. 3 shows the configuration of the image data transmitted from the display port transmitter 100 to the display 40.

As shown in FIG. 3, the image data transmitted to the display 40 via the display port transmitter 100 is included of blanking data and valid image data. The valid image data is stored in the image buffer memory 20 and transferred to the display 40 via the display port transmitter 100 shown in FIG. 2. The blanking data is generated by a blanking data generation circuit included in the display port transmitter 10, though not shown in FIG. 2, during a vertical blanking interval and a horizontal blanking interval.

Specifically, in a first step, the vertical blanking interval is provided. In the vertical blanking interval, all the data in a single horizontal line is blanking data, and the data of the blanking interval is generated by the display port transmitter 100 and transferred to the display 40.

In a second step, the vertical valid image data interval is provided. The vertical valid image data interval is divided into two regions. In the vertical valid image data interval, the horizontal blanking interval is the blanking data generated by the display port transmitter 100, and the horizontal valid image data interval is the valid image data read out from the image buffer memory 20. Both types of data are transferred from the display port transmitter 100 to the display 40 with respect to each horizontal line.

In a third step, the vertical blanking interval is provided. In the vertical blanking interval, all the data in a single horizontal line is blanking data, and the data of the blanking interval is generated by the display port transmitter 100 and transferred to the display 40.

Every piece of data in a single horizontal line transferred from the display port transmitter 100 is configured by a plural pieces of packet data TU.

This embodiment shows an exemplary case in which n transfer packets are set as the packet quantity for transferring the valid image data in a single horizontal line, in which case packet data TU0 to TU (n) are transferred as an example. In this case, packet data TU(n+1) . . . are to be transferred as the valid image data in the next horizontal line.

Thus, the packet data TU is sequentially transmitted until the data of all the valid image data interval has been transferred.

Accordingly, the image is displayed on the display 40 according to all the packet data.

It should be noted that the packet data TU is configured by the valid data, an FS symbol indicative of start of the dummy data, the dummy data, and FE data indicative of termination of the dummy data.

Figure 4:
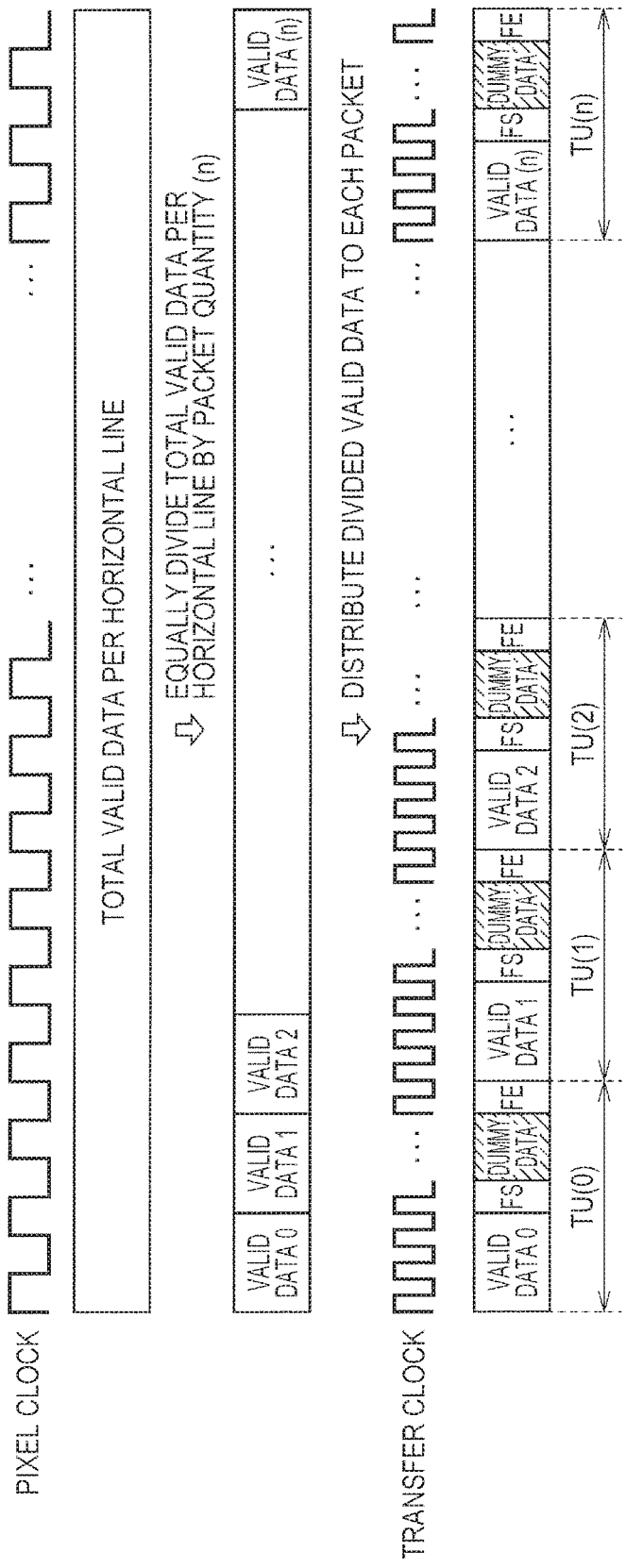
FIG. 4 illustrates a process flow when transmitting total valid data per horizontal line using packet data TU.

FIG. 4 illustrates a process flow when transmitting the total valid data per horizontal line using the packet data TU FIG. 4 shows a pixel clock used for displaying on the display 40 and a transfer clock used when transmitting the packet data TU. Because the transfer clock has a higher frequency than the pixel clock, the total valid data per horizontal line is divided by the total packet quantity that can be transferred to a horizontal valid image data interval in a single horizontal line on the display 40 side.

Each of the divided valid data pieces 0 to (n) is allocated to each pieces of packet data TU0 to TU(n), and the packet data including the allocated valid data is transferred to the display 40.

For example, the packet data is configured in units of 32 to 64 bytes.

According to a display port standard, data transfer rate of image data is faster by the transfer clock than by the pixel clock when displayed on the display 40. Thus, based on the display port standard, packet data is generated by adding a certain amount of dummy data to the valid data, and the data transfer is performed with the transfer rate of the valid data being lowered.

Based on the display port standard, the total valid data amount in a single horizontal line is set according to the image format.

Figure 5:
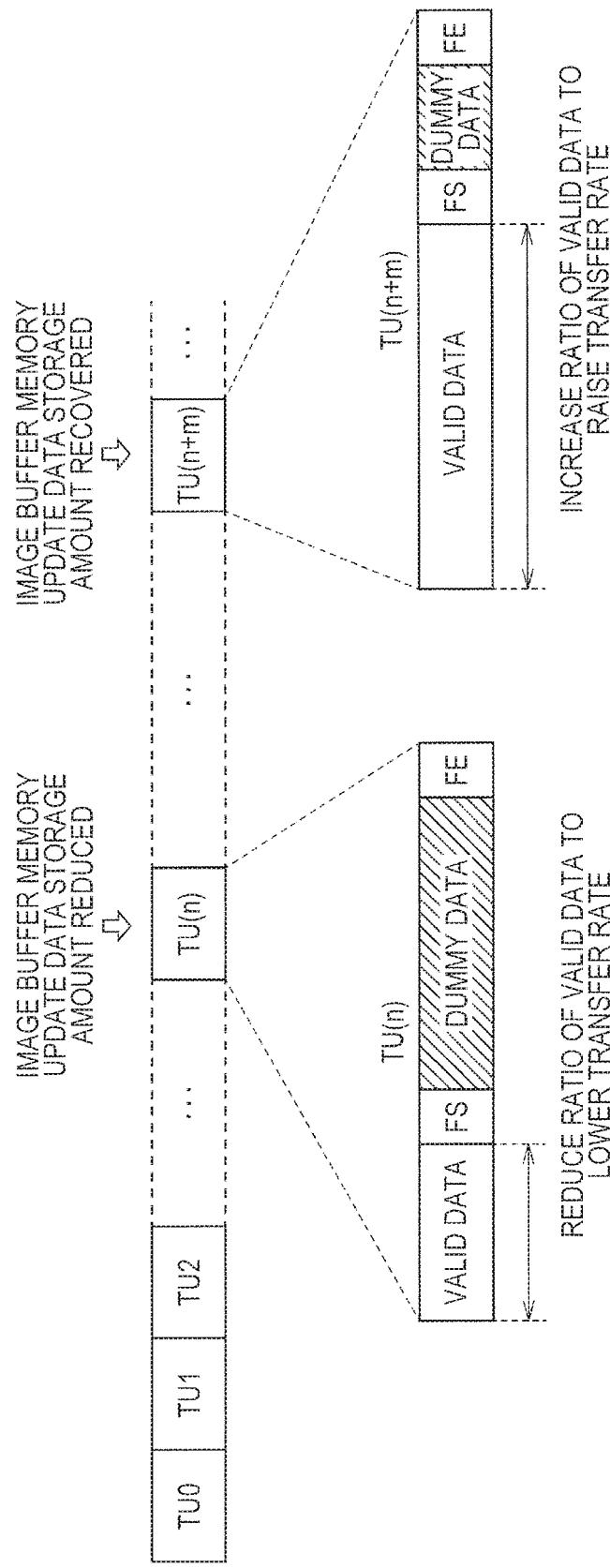
FIG. 5 illustrates adjustment of a ratio of the valid data in the packet data.

FIG. 5 illustrates adjustment of a ratio of the valid data in the packet data.

As shown in FIG. 5, when the storage amount of the update data in the image buffer memory 20 is reduced, the ratio of the valid data is reduced to lower the valid data transfer rate.

On the other hand, when the storage amount of the update data in the image buffer memory 20 is recovered (increased), the ratio of the valid data is increased to raise the valid data transfer rate.

Figure 6:
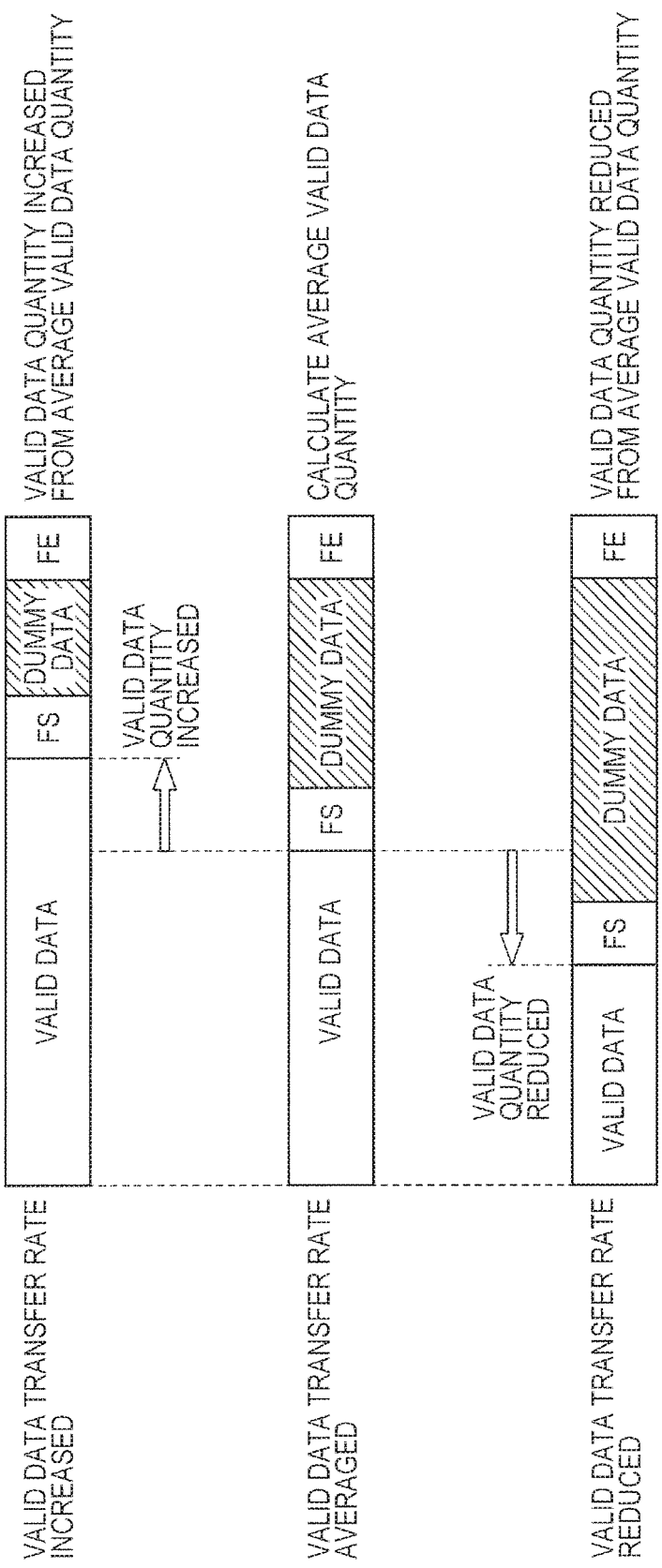
FIG. 6 illustrates the packet data generated by a packet generation section 108 according to the embodiment.

FIG. 6 illustrates the packet data generated by the packet generation section 108 according to the embodiment.

FIG. 6 shows a plural pieces of packet data in different states. As described with reference to FIG. 2, firstly the average valid data quantity is calculated by dividing the total valid data in a single horizontal line by a packet quantity in the single horizontal line and the packet data including the average valid data quantity is generated (valid data transfer rate averaged).

Secondly, when the storage amount of the update data in the image buffer memory 20 is reduced, the packet data is generated by reducing the valid data quantity from the average valid data quantity (valid data transfer rate reduced).

Finally, when the storage amount of the update data in the image buffer memory 20 is recovered (or increased), the packet data is generated by increasing the valid data quantity from the average valid data quantity (valid data transfer rate increased).

In the first embodiment, when the read access from the image buffer memory 20 to the shared memory 12 competes with the processor 16 or another module, update of the image buffer memory 20 delays, and the update data amount is reduced, the display port transmitter 100 detects a state in which the storage amount of the update data amount notified by the image buffer memory 20 and increases the dummy data amount in the packet data TU to reduce the ratio of the valid data, thereby temporarily reducing the valid data transfer rate to the display 40. This can avoid the underflow to the image buffer memory 20.

After that, when the display port transmitter 100 detects that the update data is sufficiently stored with the update data amount notified by the image buffer memory 20, the display port transmitter 100 reduces the dummy data amount in the packet data TU to increase the ratio of the valid data, thereby increasing the valid data transfer rate to the display 40. This can avoid the underflow of the image buffer memory due to the data update delay of the image buffer memory 20 in the middle of the image transfer, which makes it possible to prevent disturbance of the image on the display 40.

It should be noted that, when the storage amount of the update data in the image buffer memory 20 is recovered, the average valid data quantity may be used as the valid data quantity instead of increasing the valid data quantity in the packet data from the average valid data quantity. As described above, because the average valid data quantity is updated according to the remaining valid data quantity every time one piece of packet data TU is generated, the more the remaining valid data quantity is, the larger the value of the average valid data quantity is. Accordingly, when the storage amount of the update data in the image buffer memory 20 is recovered, the total valid data in the single horizontal line can be transferred using the average valid data quantity as the valid data quantity in the packet data.

Figure 7:
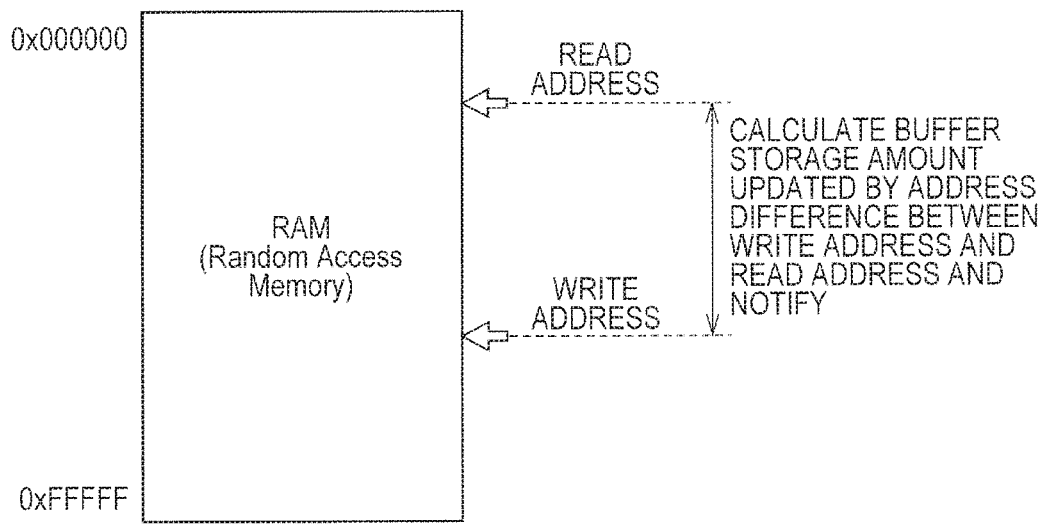
FIG. 7 illustrates a method of detecting a storage amount of update data in an image buffer memory 20 according to the first embodiment.

FIG. 7 illustrates a method of detecting the storage amount of update data in the image buffer memory 20 according to the first embodiment As shown in FIG. 7, when the image buffer memory 20 is configured by a RAM, it is possible to compare a write address for writing the image data from the shared memory 12 to the RAM with a read address for reading out the image data written to the display port transmitter 100 and detect the storage amount of the update data in the image buffer memory 20 updated by the address difference.

Specifically, when the difference between the write address and the read address is less than a predetermined threshold, it may be determined that the storage amount of the update data is reduced and the display port transmitter 100 may be notified accordingly. When the difference between the write address and the read address is equal to or more than the predetermined threshold, it may be determined that the storage amount of the update data is recovered and the display port transmitter 100 may be notified accordingly.

For comparison, the storage amount of the update data may also be detected using a plurality of thresholds.

Specifically, when the difference between the write address and the read address is less than a predetermined first threshold, it may be determined that the storage amount of the update data is reduced and the display port transmitter 100 may be notified accordingly. When the difference between the write address and the read address is equal to or more than the predetermined first threshold and less than a second threshold (first threshold<second threshold), it may be determined that the storage amount of the update data is recovered and the display port transmitter 100 may be notified accordingly. When the difference between the write address and the read address is equal to or more than the predetermined second threshold, it may be determined that the storage amount of the update data is increased and the display port transmitter 100 may be notified accordingly.

According to the notification, as shown in FIG. 5, when the storage amount of the update data in the image buffer memory 20 is reduced, the ratio of the valid data is reduced to lower the valid data transfer rate. On the other hand, when the storage amount of the update data in the image buffer memory 20 is recovered (increased), the ratio of the valid data is increased to raise the valid data transfer rate.

Figure 8:
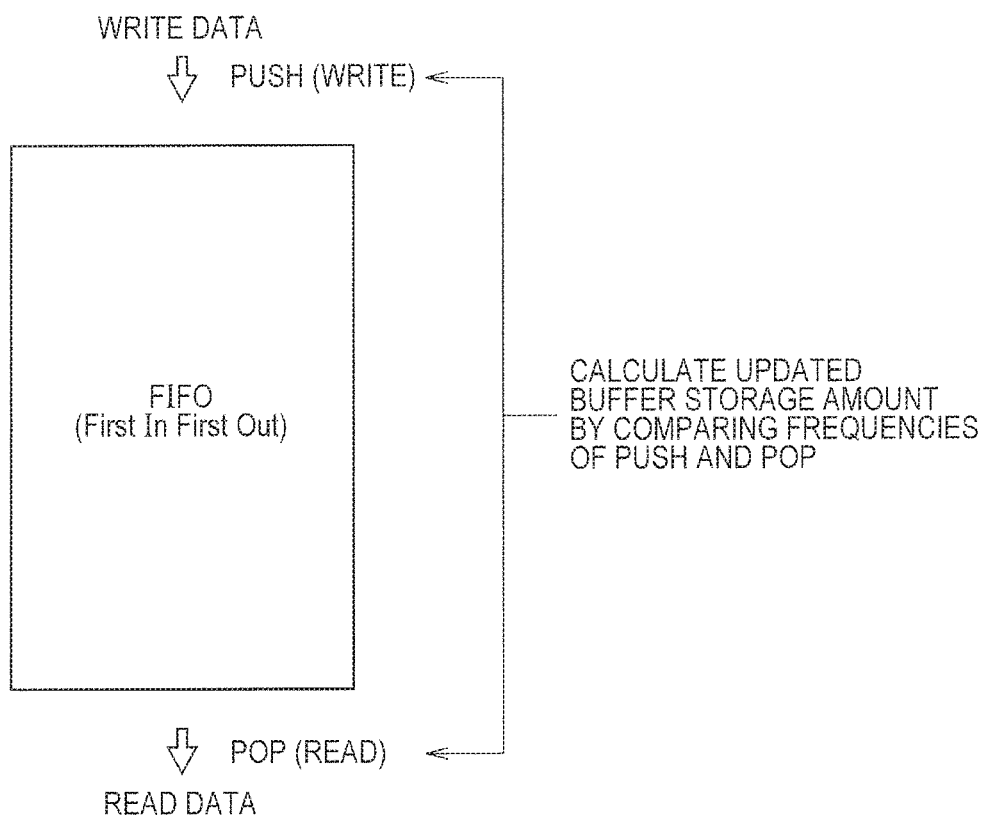
FIG. 8 illustrates another method of detecting the storage amount of the update data in the image buffer memory 20 according to the first embodiment.

FIG. 8 illustrates another method of detecting the storage amount of the update data in the image buffer memory 20 according to the first embodiment.

In FIG. 8, when the image buffer memory 20 is configured as a FIFO (First In First Out), a frequency of push (write) instructions and a frequency of pop (read) instructions are counted. The updated the storage amount of the update data in the image buffer memory 20 may be detected by counting the frequency of the push instructions and the frequency of the pop instructions and comparing these frequencies.

Specifically, when the difference between the frequency of the push (write) instructions and the frequency of the pop (read) instructions is less than a predetermined threshold, it may be determined that the storage amount of the update data is reduced and the display port transmitter 100 may be notified accordingly. Otherwise, when the difference from the frequency of the pop (read) instructions is equal to or more than the predetermined threshold, it may be determined that the storage amount of the update data is recovered and the display port transmitter 100 may be notified accordingly.

The storage amount of the update data may be detected using a plurality of thresholds.

Specifically, when the difference between the frequency of the push (write) instructions and the frequency of the pop (read) instructions is less than a predetermined first threshold, it may be determined that the storage amount of the update data is reduced and the display port transmitter 100 may be notified accordingly. Otherwise, when the difference between the frequency of the push (write) instructions and the frequency of the pop (read) instructions is equal to or more than the predetermined first threshold and less than a second threshold (first threshold<second threshold), it may be determined that the storage amount of the update data is recovered and the display port transmitter 100 may be notified accordingly. Furthermore, when the difference between the frequency of the push (write) instructions and the frequency of the pop (read) instructions is equal to or more than the predetermined second threshold, it may be determined that the storage amount of the update data is increased and the display port transmitter 100 may be notified accordingly.

According to the notification, as shown in FIG. 5, when the storage amount of the update data in the image buffer memory 20 is reduced, the ratio of the valid data is reduced to lower the valid data transfer rate. On the other hand, when the storage amount of the update data in the image buffer memory 20 is recovered (increased), the ratio of the valid data is increased to raise the valid data transfer rate.

<Second Embodiment>

Figure 9:
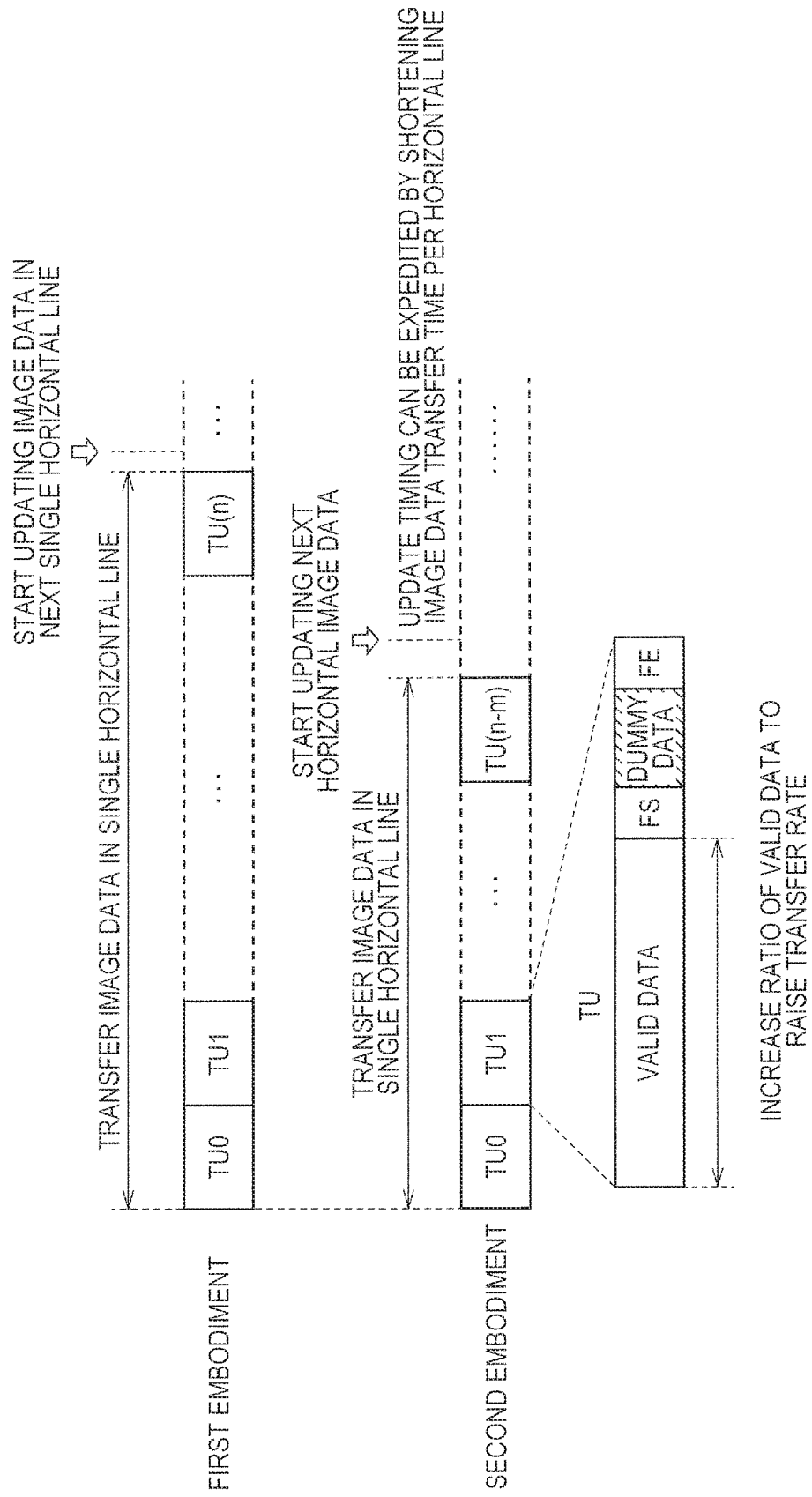
FIG. 9 illustrates a method of transmitting the packet data according to a second embodiment.

FIG. 9 illustrates a method of transmitting the packet data according to a second embodiment.

As shown in FIG. 9, for the packet data in the first embodiment, the total valid data per horizontal line is divided by the total packet quantity that can be transferred to a horizontal valid image data interval in a single horizontal line, and the divided data is distributed to each packet.

The second embodiment is described taking an example in which the is no access to the shared memory 12 from the processor 16 or any other peripheral module 18 and the image buffer memory 20 can ensure a sufficient band for the read access to the shared memory 12. Moreover, when the updated data storage amount in the image buffer memory 20 is sufficient, the display port transmitter 100 raises the valid data transfer rate by reducing the ratio of the dummy data in the packet data TU. Specifically, the valid data transfer rate is raised by increasing the ratio of the valid data.

This allows for shortening the transfer interval of the valid data in a single horizontal line.

By shortening the transfer interval of the valid data in a single horizontal line, it is made possible to update the image buffer memory 20 at a timing earlier than before.

Accordingly, even when the read access to the shared memory 12 delays due to the competition with another access from the processor 16 or another peripheral module 18, the transfer interval of the valid data can be shortened, thereby minimizing possibility of causing the underflow.

Furthermore, by shortening the transfer interval of the image data in a single horizontal line, it is also possible to raise the data transfer from the shared memory 12 to the image buffer memory 20 and thus to shorten the interval during which the image buffer memory 20 occupies the shared memory or the shared bus 14, thereby improving the performance of the whole system.

<Third Embodiment>

Figure 10:
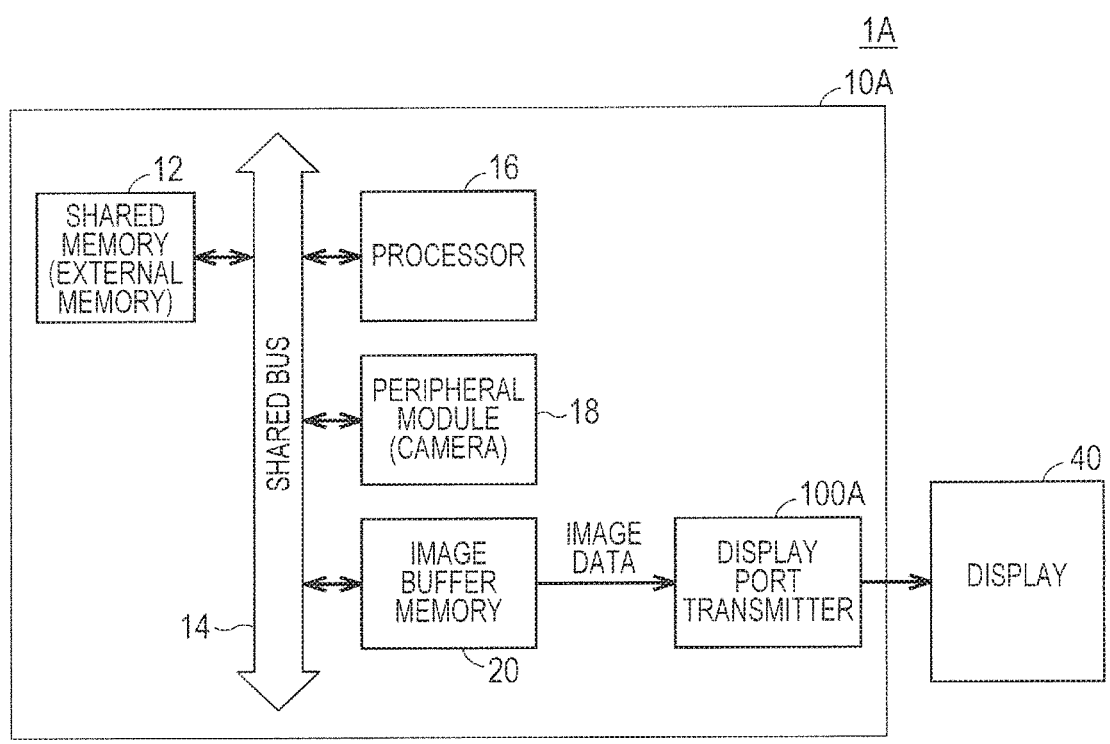
FIG. 10 illustrates an image system 1A according to a third embodiment.

FIG. 10 illustrates an image system 1A according to a third embodiment. As shown in FIG. 10, the image system 1A is different from the image system 1 in that the image data unit 10 is replaced by an image data unit 10A.

The image data unit 10A is different from the image data unit 10 in that the display port transmitter 100 is replaced by a display port transmitter 100A. Other configurations are the same as those described above and the detailed description thereof is not repeated.

The display port transmitter 100A obtains image data from the image buffer memory 20. The display port transmitter 100A in this embodiment does not receive an input of update data storage amount information.

Figure 11:
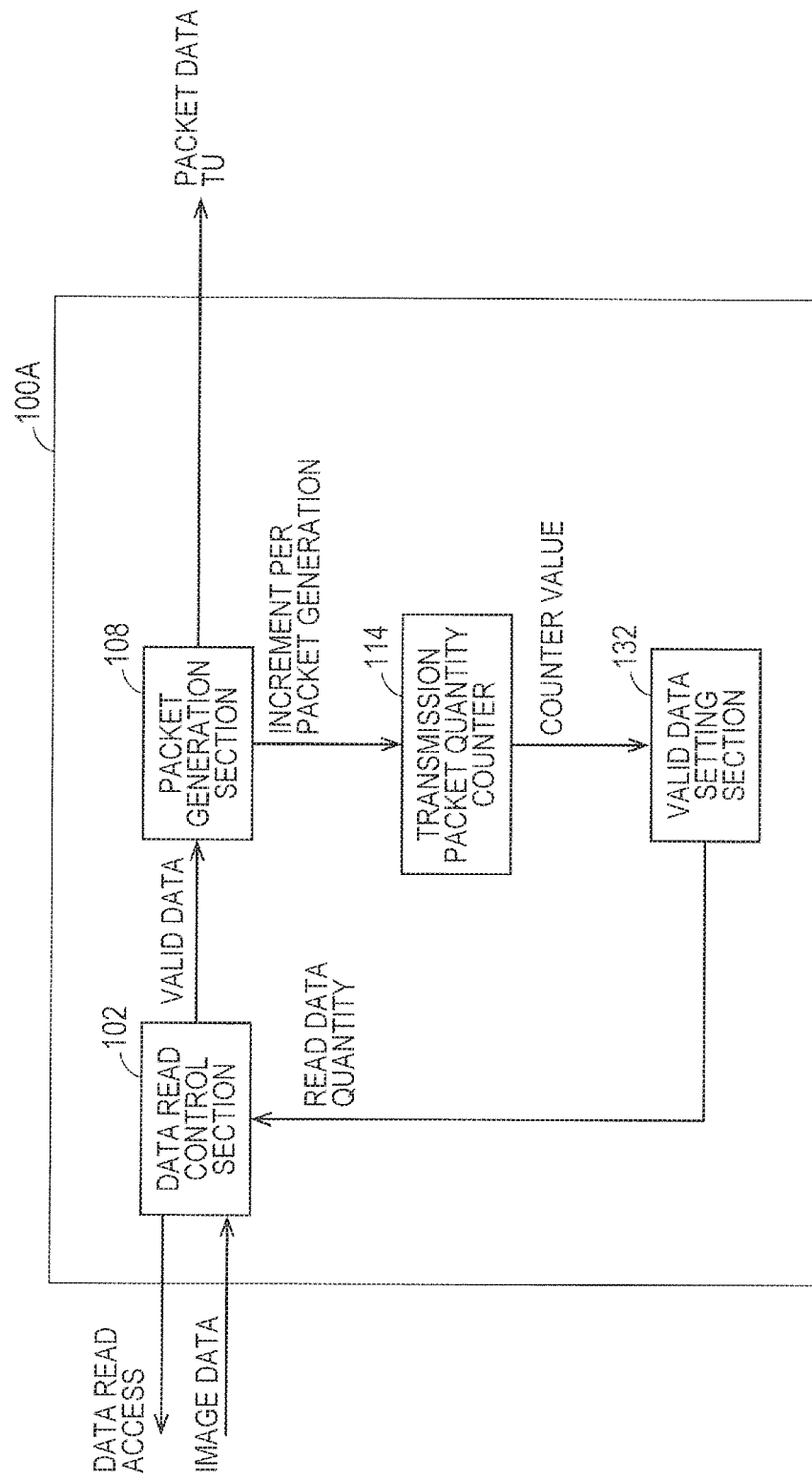
FIG. 11 is a functional block diagram of a display port transmitter 100A according to the third embodiment.

FIG. 11 is a functional block diagram of the display port transmitter 100A according to the third embodiment.

With reference to FIG. 11, the display port transmitter 100A includes the data read control section 102, the packet generation section 108, the transmission packet quantity counter 114, and a valid data setting section 132.

The data read control section 102 instructs the image buffer memory 20 to read out data (data read) (data read access) and obtains image data from the image buffer memory 20.

The packet generation section 108 generates and outputs the packet data TU including the read data output from the data read control section 102 as the valid data.

The transmission packet quantity counter 114 counts the packet quantity transmitted as the packet data TU.

The valid data setting section 132 sets the valid data quantity with respect to each packet data based on the counter value on the transmission packet quantity counter 114 and a valid data quantity setting table.

The third embodiment employs a method of setting the valid data quantity to each piece of packet data in advance.

Figure 12:
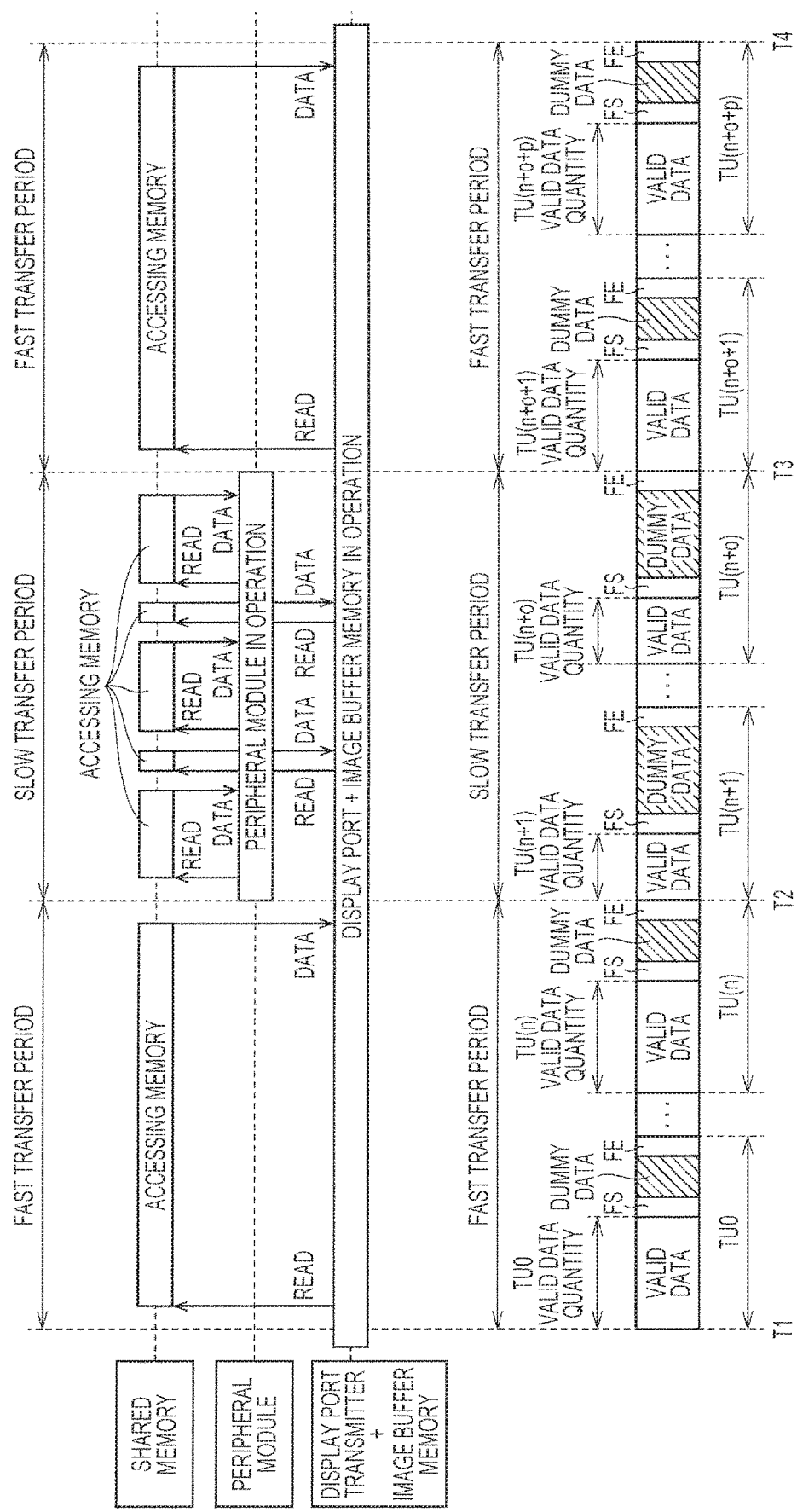
FIG. 12 illustrates a sequence of the image system 1A according to the third embodiment.

FIG. 12 illustrates a sequence of the image system 1A according to the third embodiment.

As shown in FIG. 12, the shared memory 12 is accessed by the peripheral module or the image buffer memory.

During a period from time T1 to time T2, it is assumed that the peripheral module 18 does not access the shared memory 12.

During a period from time T2 to time T3, it is assumed that the peripheral module 18 accesses the shared memory 12.

During a period from time T3 to time 14, it is assumed that the peripheral module 18 does not access the shared memory 12.

In the third embodiment, a predetermined period in the sequence processing of the image system 1A is classified into a fast transfer period or a slow transfer period.

The fast transfer period is a period during which the display port transmitter 100A is supposed to be able to occupy the access to the shared memory 12. During this period, an access from another peripheral module 18 to the shared memory 12 is hardly anticipated.

The slow transfer period is a period during which the display port transmitter 100A is supposed to be unable to occupy the access to the shared memory 12. During this period, an access from another peripheral module 18 to the shared memory 12 is anticipated.

For example, in a system that displays an image taken by a camera module being the peripheral module 18 on the display 40, a period during which the image taken by the camera module is stored in the shared memory 12 and a period during which the image stored in the shared memory 12 is displayed on the display 40 may be sometimes set in advance. In such a case, the period during which the image taken by the camera module is stored in the shared memory 12, i.e. the period during which the peripheral module accesses the shared memory 12, may be regarded as the slow transfer period, and other period may be regarded as the fast transfer period.

In the third embodiment, periods are classified according to the sequence processing of the image system 1A as assumed in advance, and the ratio of the valid data in the packet data is adjusted according to the classified period.

For the packet data in a position to be transferred to the fast transfer period, packet data is transferred with the valid data quantity increased and the dummy data decreased.

On the other hand, for the packet data in a position to be transferred to the slow transfer period, packet data is transferred with the valid data quantity decreased and the dummy data increased.

Figure 13:
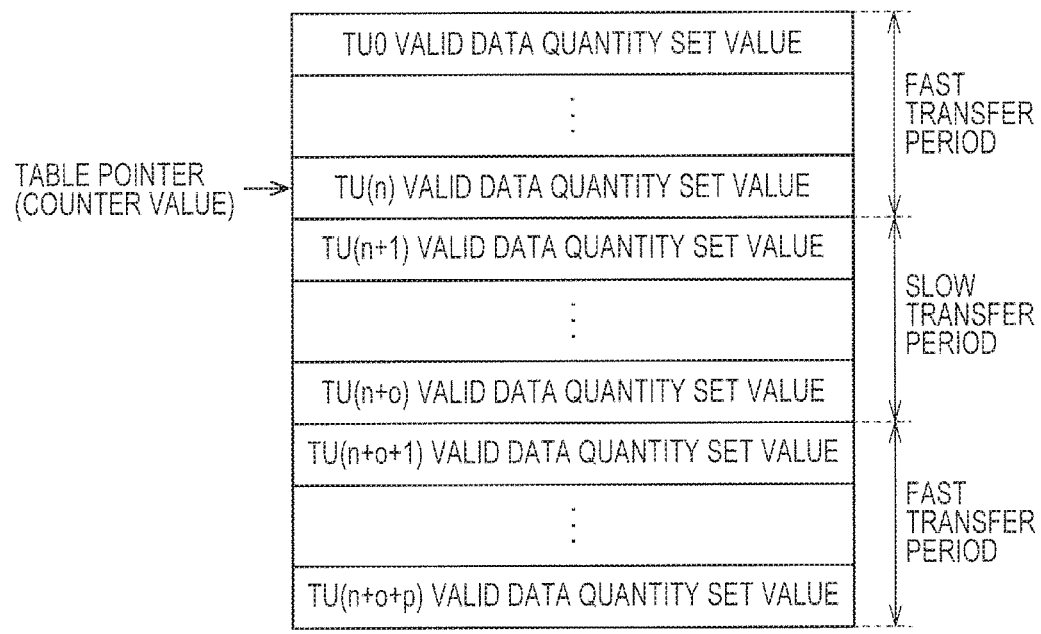
FIG. 13 illustrates a valid data quantity setting table according to the third embodiment.

FIG. 13 illustrates a valid data quantity setting table according to the third embodiment.

As shown in FIG. 13, the valid data quantity setting table stores therein set values of the valid data quantity with respect to each piece of packet data TU.

Specifically, the valid data quantity is set corresponding to each piece of packet data TU0 to TU(n) in the position to be transferred to the fast transfer period.

Furthermore, the valid data quantity is set corresponding to each piece of packet data TU(n+1) to (n+o) in the position to be transferred to the slow transfer period.

Moreover, the valid data quantity is set corresponding to each piece of packet data TU(n+o+1) to (n+o+p) in the position to be transferred to the fast transfer period.

In the third embodiment, the set value of the valid data quantity stored in the valid data quantity setting table is sequentially read out according to a table pointer (counter value) and output to the data read control section 102 as the read data quantity.

Specifically, in the first fast transfer period, the valid data quantity of the packet data TU0 to TUn is read out according to the table pointer and output to the data read control section 102.

Then in the slow transfer period, the valid data quantity of the packet data TU(n−1) to (n+o) is read out according to the table pointer and output to the data read control section 102.

Next, in the fast transfer period, the valid data quantity of the packet data TU(n+o+1) to (n+o+p) is read out according to the table pointer and output to the data read control section 102.

The periods are classified into the fast transfer period and the slow transfer period in advance, and the valid data quantity of the packet data in the position to be transferred to the corresponding period is adjusted. This method can prevent underflow from occurring by executing the slow transfer period in the period during which the read access to the shared memory competes with the processor 16 or another peripheral module 18 and executing the fast transfer period in the period during which the read access does not compete.

This method also enables control without notification of information about the update data storage amount from the image buffer memory 20.

Although this embodiment is described with the configuration provided with the valid data quantity setting table for setting the valid data quantity with respect to each piece of packet data, instead of setting the valid data quantity for all pieces of packet data, a number of the packet data when switching from the fast transfer period to the slow transfer period or from the slow transfer period to the fast transfer period may be stored as the information.

Then the table pointer (counter value) may be compared with the information to adjust the value of the valid data quantity. This method can reduce the size of the table.

<Fourth Embodiment>

Figure 14:
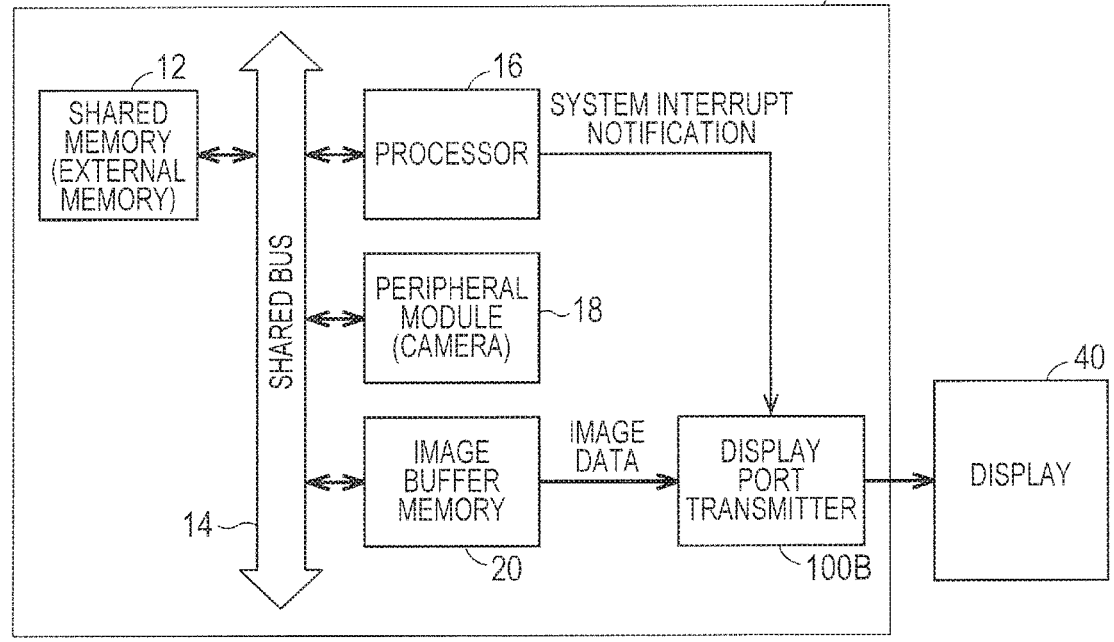
FIG. 14 illustrates an image system 1B according to a fourth embodiment.

FIG. 14 illustrates an image system 1B according to a fourth embodiment.

As shown in FIG. 14, the image system 1B is different from the image system 1A in that the image data unit 10 is replaced by an image data unit 10B.

The image data unit 10B is different from the image data unit 10 in that the display port transmitter 100 is replaced by a display port transmitter 100B. Other configurations are the same as those described above and the detailed description thereof is not repeated.

The display port transmitter 100B obtains image data from the image buffer memory 20. It also receives a system interrupt notification from the processor 16.

The display port transmitter 100B according to the fourth embodiment adjusts the ratio of the valid data in the packet data according to the system interrupt processing notification from the processor 16.

Specifically, it reduces the ratio of the valid data and raises the increases the ratio of the dummy data according to the notification of the interrupt processing from the processor 16.

On the other hand, it increases the ratio of the valid data and reduces the ratio of the dummy data according to the notification of termination of the interrupt processing from the processor 16.

Figure 15:
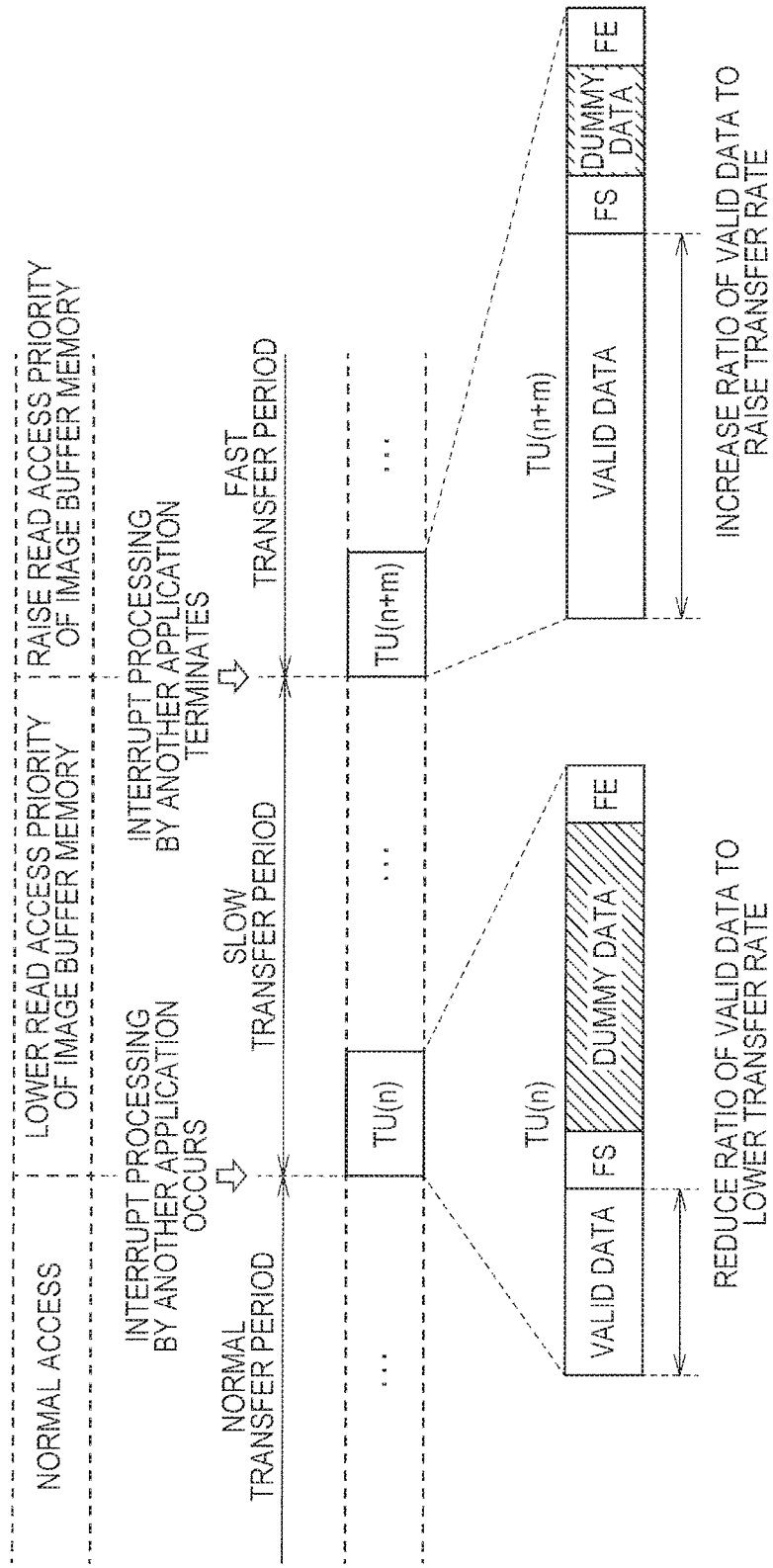
FIG. 15 illustrates a sequence of the image system 1B according to a fifth embodiment.

FIG. 15 illustrates a sequence of the image system 1B according to a fifth embodiment.

As shown in FIG. 15, in case of an interrupt processing by another application, the ratio of the valid data is reduced to be the slow transfer period.

On the other hand, when the interrupt processing by another application terminates, the ratio of the valid data is increased to be the fast transfer period.

This system makes it possible to prioritize an access to the shared memory and the shared bus 14 by another peripheral module 18 by lowering the priority of an access to the shared memory 12 by the image buffer memory 20 in case of the interrupt processing. Namely, the system interrupt notification indicates that the priority to access the shared memory 12 has changed. This processing can prevent underflow from occurring by executing the slow transfer period, when the system interrupt processing occurs, and executing the fast transfer period in another during which the access does not compete.

Although the disclosure has been specifically described above with reference to the embodiments, it is needless to say that the disclosure is not limited to the embodiments but can be modified in various ways without departing from the scope of the disclosure.

What is claimed is:

1. A data transfer apparatus that transfers image data in an image buffer memory to a display, the apparatus comprising:
    a packet generation section that generates a transfer packet comprised of valid data and dummy data, the valid data being the image data, and transfers the transfer packet to the display, and
    a data adjustment section that adjusts a ratio between the valid data and the dummy data in the transfer packet based on a data storage amount in the image buffer memory,
    wherein the data adjustment section:
    calculates an average value of the image data to be transferred in a single transfer packet;
    adjusts the ratio between the valid data and the dummy data in the transfer packet based on the data storage amount in the image buffer memory and the calculated average value;
    obtains remaining mage data based on information about the whole image data to be transmitted in a single horizontal line and information about the image data already transmitted;
    obtains quantity of the remaining transfer packets based on the quantity of all the transfer packets to be transmitted in the single horizontal line and the quantity of the transfer packets already transmitted; and
    calculates an average value of the image data to be transferred in the single transfer packet based on the remaining image data and the quantity of the remaining transfer packets.

2. The data transfer apparatus according to claim 1, wherein the data adjustment section:
    determines whether the data storage amount in the image buffer memory is reduced, and when it is determined that the data storage amount is reduced, reduces the ratio of the valid data to the dummy data and increases the ratio of the dummy data to the valid data.

3. The data transfer apparatus according to claim 2, wherein the data adjustment section determines whether the data storage amount in the image buffer memory is reduced based on address information about write image data when writing the imaged data stored in a memory to the image buffer memory and address information about read image data when reading the image data written to the buffer memory.

4. The data transfer apparatus according to claim 2, wherein data is input to and output from the image buffer memory according to a push instruction and a pop instruction, and
    wherein the data adjustment section determines whether the data storage amount in the image buffer memory is reduced based on a quantity of the push instruction and a quantity of the pop instruction.

5. The data transfer apparatus according to claim 1, wherein the data adjustment section:
    determines whether the data storage amount in the image buffer memory is increased, and when it is determined that the data storage amount is increased, increases the ratio of the valid data to the dummy data and reduces the ratio of the dummy data to the valid data.

6. A data transfer apparatus that transfers image data in an image buffer memory to a display, the apparatus comprising:
    a packet generation section that generates a transfer packet to be transferred to the display including valid data and dummy data; and
    a data adjustment section that adjusts a ratio between the valid data and the dummy data in the transfer packet,
    wherein a fast transfer period and a slow transfer period are set in advance, and
    wherein the data adjustment section:
    increases a ratio of the valid data to the dummy data and reduces a ratio of the dummy data to the valid data in the fast transfer period; and
    reduces the ratio of the valid data to the dummy data and increases the ratio of the dummy data to the valid data in the slow transfer period;
    calculates an average value of the image data to be transferred in a single transfer packet;

adjusts the ratio between the valid data and the dummy data in the transfer packet based on the data storage amount in the image buffer memory and the calculated average value;

obtains remaining image data based on information about the whole image data to be transmitted in a single horizontal line and information about the image data already transmitted, obtains quantity of the remaining transfer packets based on the quantity of all the transfer packets to be transmitted in the single horizontal line and the quantity of the transfer packets already transmitted: and calculates an average value of the image data to be transferred in the single transfer packet based on the remaining image data and the quantity of the remaining transfer packets.

7. A data transfer apparatus that transfers image data in an image buffer memory to a display, the apparatus comprising:

a packet generation section that generates a transfer packet to be transferred to the display including valid data and dummy data; and a data adjustment section that adjusts a ratio between the valid data and the dummy data in the transfer packet, and wherein the data adjustment section:

reduces a ratio of the valid data to the dummy data and increases a ratio of the dummy data to the valid data according to a notification of an interrupt processing from an external device; and increases the ratio of the valid data to the dummy data and reduces the ratio of the dummy data to the valid data according to termination of the interrupt processing from the external device;

calculates an average value of the image data to be transferred in a single transfer packet;

adjusts the ratio between the valid data and the dummy data in the transfer packet based on the data storage amount in the image buffer memory and the calculated average value:

obtains remaining image data based on information about the whole image data to be transmitted in a single horizontal line and information about the image data already transmitted obtains quantity of the remaining transfer packets based on the quantity all the transfer packets to be transmitted in the single horizontal line and the quantity of the transfer packets already transmitted; and calculates an average value of the image data to be transferred in the single transfer packet based on the remaining image data and the quantity of the remaining transfer packets.

* * * * *